US008560627B2

(12) United States Patent
Krieg et al.

(10) Patent No.: US 8,560,627 B2
(45) Date of Patent: Oct. 15, 2013

(54) VIRTUAL SWITCH FOR USE IN FIBRE CHANNEL APPLICATIONS

(75) Inventors: William R. Krieg, Cary, NC (US); Jeffrey J. Shafer, Sanford, NC (US)

(73) Assignee: Alcatel Lucent, Paris (FR)

( * ) Notice: Subject to any disclaimer, the term of this patent is extended or adjusted under 35 U.S.C. 154(b) by 4180 days.

(21) Appl. No.: 10/444,817

(22) Filed: May 23, 2003

(65) Prior Publication Data

US 2004/0233921 A1    Nov. 25, 2004

(51) Int. Cl.
*G06F 15/16*    (2006.01)
(52) U.S. Cl.
USPC ........................................... 709/211
(58) Field of Classification Search
USPC ........................................... 709/211
See application file for complete search history.

(56) References Cited

U.S. PATENT DOCUMENTS

| | | | |
|---|---|---|---|
| 7,421,509 B2 * | 9/2008 | Lolayekar et al. | 709/235 |
| 7,437,606 B2 * | 10/2008 | Janakiraman et al. | 714/15 |
| 2002/0002638 A1 * | 1/2002 | Obara | 710/11 |
| 2002/0034178 A1 * | 3/2002 | Schmidt et al. | 370/386 |
| 2003/0012204 A1 * | 1/2003 | Czeiger et al. | 370/401 |
| 2003/0084219 A1 * | 5/2003 | Yao et al. | 710/300 |
| 2003/0212781 A1 * | 11/2003 | Kaneda et al. | 709/223 |
| 2005/0018673 A1 * | 1/2005 | Dropps et al. | 370/389 |
| 2005/0120160 A1 * | 6/2005 | Plouffe et al. | 711/1 |
| 2005/0246708 A1 * | 11/2005 | Turner et al. | 718/102 |
| 2006/0075191 A1 * | 4/2006 | Lolayekar et al. | 711/114 |

OTHER PUBLICATIONS

Brothers, Timothy J.; Muknahallipatna, Suresh; Hamann, Jerry C., "Fibre Channel Switch Modeling at Fibre Channel-2 Level for Large Fabric Storage Area Network Simulations using OMNeT++: Preliminary Results," Local Computer Networks, 2007. LCN 2007. 32nd IEEE Conference on , vol., No., pp. 191-202, Oct. 15-18, 2007.*

Definition: Domain ID, from "http://www.storagewiki.com", last edited Feb. 16, 2006.*

* cited by examiner

*Primary Examiner* — Christopher Biagini
(74) *Attorney, Agent, or Firm* — Carlson, Gaskey & Olds, P.C.

(57) ABSTRACT

A virtual switch for use in fiber channel applications is described herein. In an exemplary implementation, a virtual switch is created. The virtual switch stores control-traffic-information associated with a device in a remote autonomous region of a fabric. The device has a domain ID associated with the autonomous region in which it is located. A virtual domain ID associated with the virtual switch is assigned to the device. Accordingly, the virtual domain ID is provided to other autonomous regions for sharing the device.

18 Claims, 5 Drawing Sheets

VIRTUAL SWITCH FOR USE IN FIBRE CHANNEL APPLICATIONS

TECHNICAL FIELD

The exemplary implementation relates generally to storage area networks (SANs), and, more specifically, to fibre channel switching within SANs.

BACKGROUND

Storage area networks (SANs) are networks designed to link host computers to storage devices. Fibre Channel (FC) is a standard protocol adopted for use in many SANs. In FC terms, a group of one or more switches interconnecting the hosts to the storage devices is called a "fabric". A fabric is a collection of switches that allow the hosts and storage devices to cooperate with each other within the SAN. These storage devices may include, but are not limited to: JBODs (Just a Bunch of Disks); Redundant Array of Independent Disks (RAID) arrays; tape backups; tape libraries; CD-ROM libraries; and other related devices. The current configuration of FC fabrics is limited by a number of constraints associated with current addressing protocols used in FC, and is further limited by the behavior induced when different types of FC control traffic is propagated throughout the fabric. This limits the size, performance, and overall efficiency of fabrics.

SUMMARY

A virtual switch for use in fibre channel applications is described herein. In an exemplary implementation, a virtual switch is created. The virtual switch stores control-traffic-information associated with a device in a remote autonomous region of a fabric. The device has a domain ID associated with the autonomous region in which it is located. A virtual domain ID associated with the virtual switch is assigned to the device. Accordingly, the virtual domain ID is provided to other autonomous regions for sharing the device.

BRIEF DESCRIPTION OF THE DRAWINGS

The detailed description is described with reference to the accompanying figures. In the figures, the left-most digit(s) of a reference number identifies the Fig. in which the reference number first appears.

DETAILED DESCRIPTION

Figure 1:
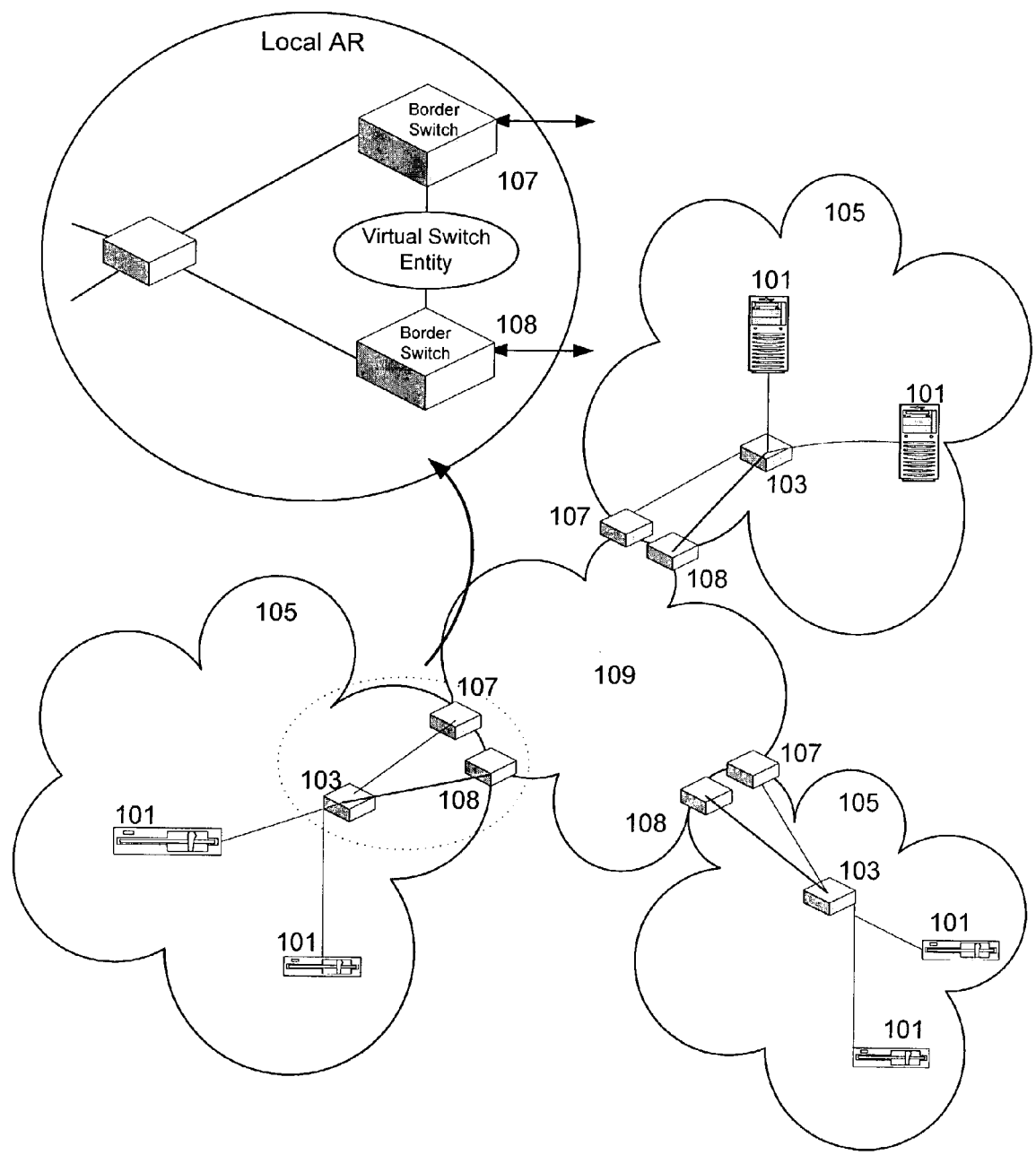
FIG. 1 illustrates a SAN environment in which a virtual switch may be implemented.

Storage Area Networks (SAN) have been developed as a means for interconnecting host servers to storage devices. A storage area network comprises a network linking one or more hosts to one or more storage systems. The hosts and storage systems with a SAN are referred to as "end devices." Communication between end devices within a SAN is typically accomplished using a plurality of switches that comprise a fabric. The switches within the fabric typically communicate in accordance with the Fibre Channel protocol and perform system management functions. For example, fabric switches perform a process known a "zoning" whereby the switches allow access to certain storage devices by selected servers. Switches are assigned a domain identification number ("Domain ID") to identify the switch and all the devices connected to the switch. Each device within a SAN operating under the FC protocol is assigned a world wide name identification number ("WWN ID"). The WWN ID for a device becomes associated (i.e., registered) with the Domain ID of the switch to which it is connected. This allows the entire fabric to identify the devices that are connected to each switch and allows for routing of information between switches and end devices.

The information upon which the fabric operates (e.g., what devices are connected to the fabric, the zoning configuration, etc.) is stored in a database contained within each switch in the fabric. When an additional switch is added to the fabric, the database information is automatically uploaded to the new switch. The new switch, along with any devices attached to the new switch, become part of the fabric.

The total number of switches that can comprise a fabric is limited by hardware devices and by addressing rules present in the FC standard. Practically, fabrics comprising a heterogeneous mix of vendor hardware are often limited to approximately 24 to 32 switches. This creates scalability issues. Some SANs can have several thousand devices, thus the limited number of switches in a particular fabric creates limitations with the total possible size of the fabric. This necessitates having a multitude of fabrics in a single SAN. Communication between fabrics is accomplished via a server, bridge, or "data mover" device that is physically connected to each fabric. This is a highly inefficient process because it requires information to be pulled from one fabric and sent to another fabric via the bridging device to enable end device communication across fabrics within a SAN.

As the number of switches increases, the amount of information that must be contained in each switch also increases, and thus the amount of control traffic necessary to keep every switch within the fabric updated with the most current fabric information increases correspondingly. For example, each time a state change occurs (e.g., a new switch is added, an additional device is connected), a registered state change notification (RSCN) message is sent throughout every switch in the fabric. In large SANs, the amount of control traffic increases to the point where it can be disruptive to the operation of the system.

The concept of autonomous regions is defined in the FC standards as a way to partition a SAN fabric into multiple independent sub-fabrics that are interconnected. An autonomous region is a segment of a fabric that can be managed as a separate region with separate Domain IDs, and is connected to other autonomous regions via a switch at the AR border, known as a border switch. A series of autonomous regions is used to achieve scalability and minimize control traffic between SAN segments without building a series of separate fabrics.

One of the limitations in the structure of FC fabrics that use autonomous regions is the inability to support multi-pathing for redundant connections between end devices. These redundant connections are needed to ensure that devices are continuously reachable, even in the event of equipment or path failure. Storage networking traffic transported between autonomous regions that is routed through a single point of failure (i.e., a single border switch) does not provide a backup path, which increases the risk of devices becoming unavailable, or being "dropped," in the event of a border switch failure.

An exemplary implementation described herein extends the concept of autonomous regions to create greater path redundancy by creating a "virtual switch." The virtual switch is allocated a Domain ID, which may be shared between two or more physical border switches in the same autonomous region. The creation of a virtual switch is identified as "domain virtualization." When a virtual switch is shared between multiple border switches, data can be routed to the virtual switch (and to the attached end devices) from within an autonomous region using multiple paths.

FIG. 1 illustrates an exemplary SAN environment in which a virtual switch is implemented. The virtual switch is shared between two border switches. A number of end devices 101 are contained within the SAN. These devices may include JBODs (Just a Bunch of Disks), RAID (Remote Array of Independent Disks) arrays, CD-ROM libraries, or other various storage devices. Each end device 101 is connected to a FC switch 103. FC switches 103 are contained within a series of remote autonomous regions 105. Each autonomous region 105 contains two border switches 107, 108 which are used to interconnect the autonomous regions 105 across the backbone region 109.

Figure 2:
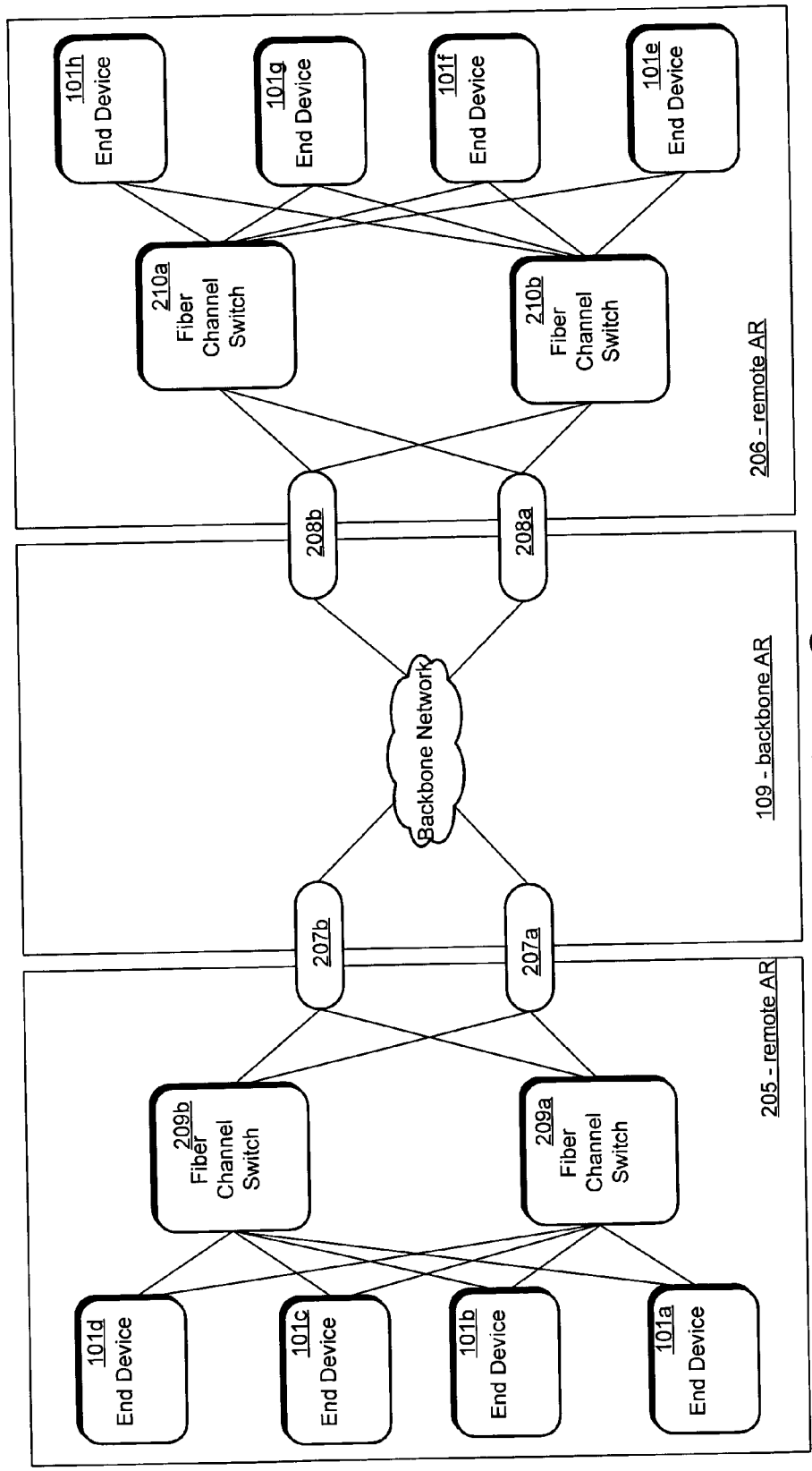
FIG. 2 illustrates a physical layout of a fabric.

FIG. 2 is a block diagram of a fabric showing physical switch connections. In the exemplary implementation shown in FIG. 2, there are two border switches per autonomous region in order to support path redundancy. For simplicity, only two remote autonomous regions are shown. It is, however, appreciated that the topography demonstrated in FIG. 2 could be applied to any number of autonomous regions.

Autonomous region 109 is referred to as the "backbone" autonomous region in the exemplary implementation. Backbone autonomous region 109 provides a communication channel between the fabrics. A pair of remote autonomous regions 205, 206 are shown attached to backbone autonomous region 109. Remote autonomous region 205 is physically connected to backbone autonomous region 109 via a first pair of border switches 207a, 207b. Remote autonomous region 206 is physically connected to backbone autonomous region 109 via a second pair of border switches 208a, 208b.

Contained within each remote autonomous region 205, 206 are two additional fiber channel switches (209a, 209b and 210a, 210b). In the exemplary environment of FIG. 2, each remote autonomous region 205, 206 contains two fiber channel switches (209a, 209b and 210a, 210b, respectively) in addition to the border switches (207a, 207b and 208a, 208b, respectively), although it is understood that various numbers of switches could be contained with a remote autonomous region. Each fiber channel switch (209a, 209b, 210a, 210b) is coupled to one or more of the various end devices (101a-d, 101e-h).

By physically configuring each remote autonomous region in the manner shown in FIG. 2, path redundancy is created. Multiple physical paths between backbone autonomous region 109 and each end device 101a-h are created. This allows the end devices to remain in physical contact with backbone autonomous region 109 in the event of a failure of one of the border switches or one of the fiber channel switches. For example, should border switch 207a fail, end device 101a would remain in physical connection with backbone autonomous region 109 via border switch 207b and either fiber channel switch (209a, 209b).

Figure 3:
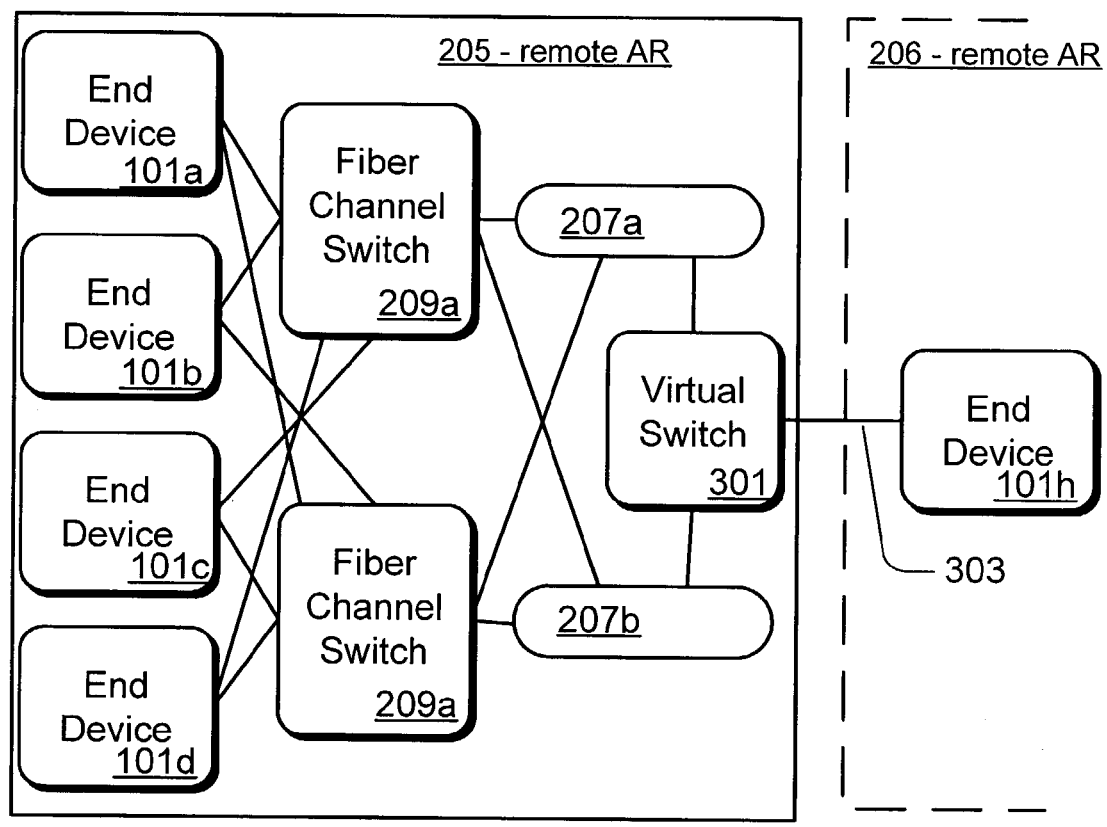
FIG. 3 illustrates a logical view of a fabric.

FIG. 3 illustrates a logical view of how a device 101h physically residing in remote autonomous region 206 appears to the border switches 207a, 207b located in remote autonomous region 205. In accordance with this exemplary implementation, a virtual switch 301 is created. Virtual switch 301 is provided to act as a proxy switch for all end devices located within remote autonomous regions 206, creating the appearance that end devices from autonomous region 206 are directly connected to virtual switch 301. Virtual switch 301 behaves like a normal FC switch. For example, it is assigned a unique Domain ID, it is added to the fabric like other FC switches, and it allows data flow to the end device 101h through two different data paths. Virtual switch 301, however, is a logical device, implemented using software or programmed into a hardware configuration. It is a series of logical instructions shared across all of the border switches within the fabric. By configuring end devices in remote autonomous region 206 to appear as attached to virtual switch 301, and by basing the end device's FC identification on the Domain ID of virtual switch 301, the number of autonomous regions (and correspondingly the number of fiber channel switches and end devices) is not limited by prior addressing rules. The addressing limitations only apply within a particular autonomous region.

Virtual switch 301 may also select the physical path used to route data over one of the available paths between end device 101h and autonomous region 205. A path selection component within virtual switch 301 select the physical data paths so that the switch-to-switch failover problem found in the prior art is overcome. End devices are no longer associated with a single border switch, which would cause them to be dropped if the border switch failed. End devices are now associated with virtual switch 301, assigned the Domain ID of the virtual switch (from the prospective of components within the autonomous region), and have multiple redundant paths between autonomous regions as provided by virtual switch 301. In one implementation, standard Fiber Shortest Path First (FSPF) routing protocol is used to select the appropriate data path between end devices, although it is understood that alternative routing protocols could also be used. Such alternative protocols are well known in the art.

Accordingly, a logical "firewall" is created using virtual switch 301. Control traffic that previously traveled throughout the entire fabric every time a change was made to a part of the fabric (e.g., an end device was added, etc.) is now contained with the autonomous region 301. Control traffic that crosses the backbone autonomous region 109 corresponds only to the end devices that have been shared between autonomous regions 205 and 206. This path is represented by a logical path 303 as shown in FIG. 3. Previously, a large amount of control traffic was required to flow throughout the entire fabric as the fabric became large in order to update the fabric status to all of the switches in every region. This high volume of control traffic often resulted in disruption within the system.

This high volume of control traffic has been reduced by applying virtual switch 301 to manage control traffic between autonomous regions. End devices shared from autonomous region 206 are identified with the Domain ID associated with virtual switch 301. All of the control traffic is contained within a particular autonomous region, as the need to share this information throughout the entire fabric is eliminated. Only changes to shared end device 101h (physically located in autonomous region 206) are propagated to virtual switch 301. No other control traffic from within autonomous region 206 is sent to virtual switch 301. In this manner, the disruption caused by high volumes of control traffic in the prior art are eliminated.

Figure 4:
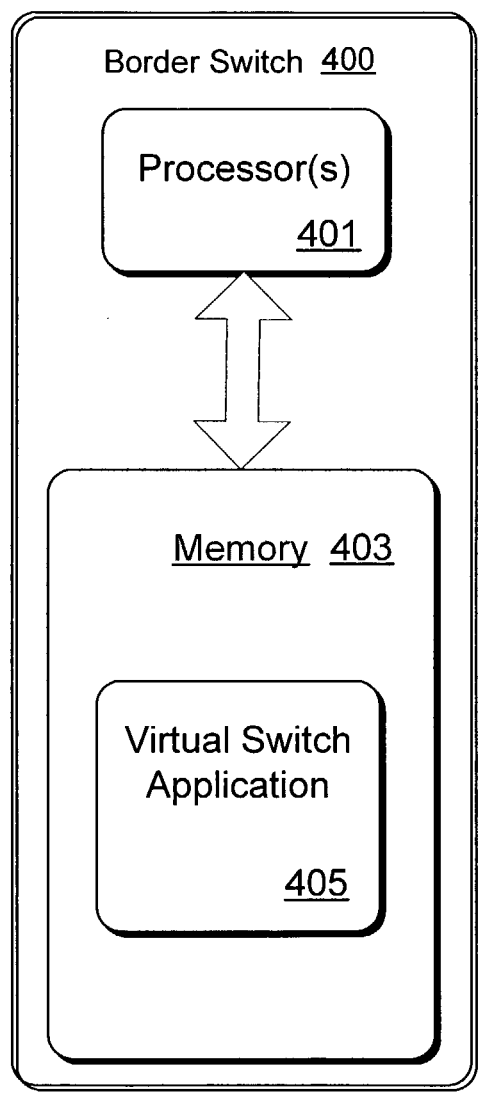
FIG. 4 is a block diagram of a border switch hosting a virtual switch.

FIG. 4 is a block diagram of a border switch hosting a virtual switch. Border switch 402 comprises a processor 401 for executing computer-executable instructions received from one or more computer-readable media used to store the computer executable instructions. The one or more computer-readable media provide non-volatile storage of computer readable instructions, data structures, program modules, and other data for border switch 402. It should be noted that the computer readable media may be any type of media (volatile or non-volatile) which can store data that is accessible by a computer (in any computer form, such as a border switch). Examples of media that can be used in the exemplary implementation include, but are not limited to, media such as a hard disk, optical disk, flash memory device, read only memories (ROM), random access memories (RAM), digital video disks, and the like. It should also be noted that virtual switch 405 could also take the form of a hardware device in the form of programmable logic.

Figure 5:
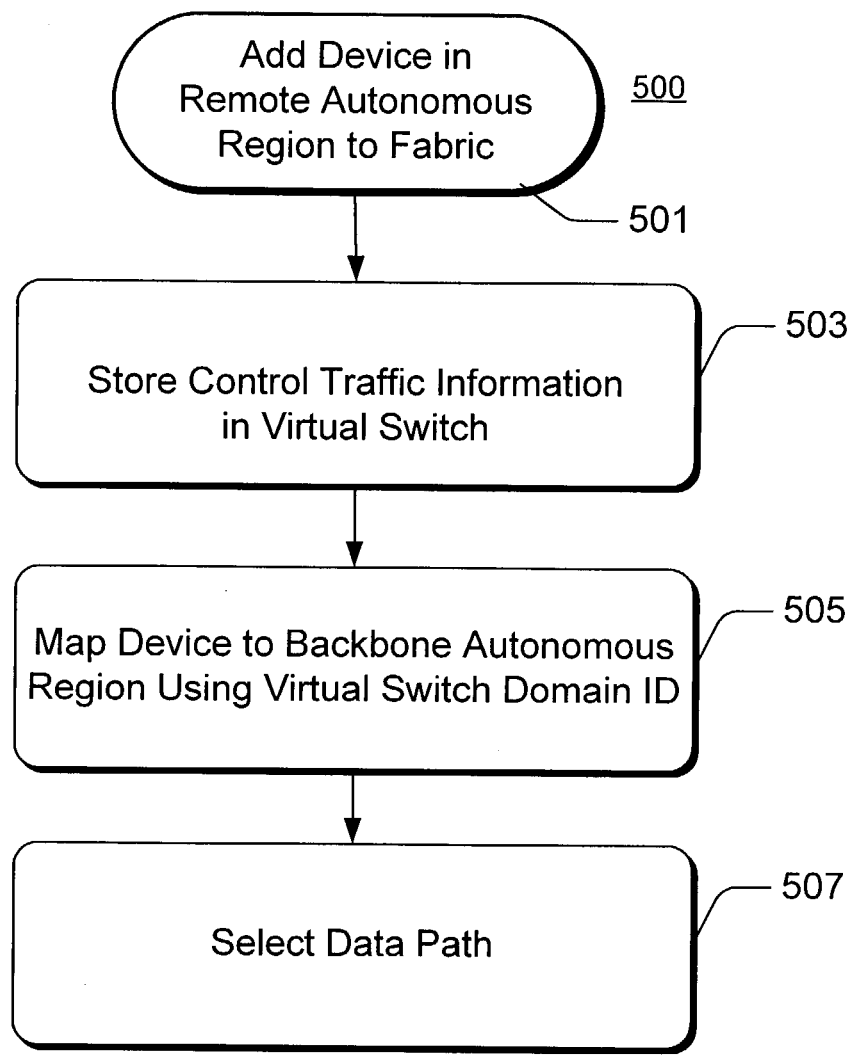
FIG. 5 is a flow chart illustrating the functions performed by the virtual switch.

FIG. 5 is a flow chart illustrating an exemplary method 500 showing the operation of the virtual switch. Method 500 includes blocks 501-507. The order in which the method is described is not intended to be construed as a limitation. Furthermore, the method 500 can be implemented in any suitable hardware, software, firmware, or combination thereof. In the exemplary implementation, method 500 is executed by processor(s) 401 in conjunction with the exemplary components described above.

When a new end device is added (for example, adding device 101h in FIG. 3) to first autonomous region (for example, autonomous region 206 in FIG. 3) and shared to a second autonomous region (for example, autonomous region 205 in FIG. 3) using the virtual switch concept (block 501), the control traffic for updating the first autonomous region is sent to the virtual switch. The virtual switch stores this information, and shares this information with fabric elements within the second autonomous region. However, if the end device is physically added to the first autonomous region and is not shared with other autonomous regions, the control traffic generated by the addition of the device remains within the first autonomous region. The information is stored within the virtual switch, but not sent to the other autonomous regions (block 503). Within the first autonomous region, the Domain ID of the new end device is "mapped" to the Domain ID of virtual switch (block 505). During a request for access to the new device, the virtual switch selects an available data path for communication with the device (block 507), preferably in accordance with the FSPF protocol.

Building a fabric using the virtual switch concept overcomes the problems associated with expanded SANs in the prior art. Size limitation (i.e., number of switches) caused by limited Domain ID addresses has been alleviated by using only one Domain ID in the virtual switch to represent the mapped Domain IDs from all other autonomous regions. Switch-to-Switch failover has been improved by allowing alternate physical paths to be chosen by the virtual switch to ensure that an end device is not dropped when a potential data path is available. Finally, disruption found in the prior art due to control traffic has been reduced by using the virtual switch to limit the amount of control traffic required within the fabric.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

For example, an alternative implementation may eliminate the border switches and allow direct connection (logical or physical) from the inerior FC switches to the virtual switch. Alternatively, a virtual switch could be used in SAN management to provide a logical simplification of the internal fabric infrastructure within autonomous regions or across autonomous regions. In yet another implementation, the backbone autonomous region may not be used. Still other implementations may be obvious to those skilled in the art.

What is claimed is:

1. One or more computer-readable media comprising computer executable instructions that, when executed, direct a computer to:
   store control-traffic-information associated with a device in a remote autonomous region of a fabric, the device having a domain ID associated with the autonomous region;
   assign a virtual domain ID to the device; and
   provide the virtual domain ID to another autonomous region of the fabric for sharing the device.

2. One or more computer-readable media as recited in claim 1, wherein the computer executable instructions further comprise instructions that, when executed, direct a computer to:
   select a data path for communication between the device and another device in the fabric.

3. One or more computer-readable media as recited in claim 1, wherein the control-traffic information includes a world wide name identification number and a domain ID number.

4. One or more computer-readable media as recited in claim 1, wherein other devices in the other autonomous region use the virtual domain ID to communicate with the device.

5. One or more computer-readable media as recited in claim 1, wherein the computer is a border switch.

6. One or more computer-readable media as recited in claim 1, where the device is a storage device in a storage area network.

7. A system, comprising: a memory comprising a set of computer-executable instructions; and a processor coupled to the memory, the processor configured to execute the computer-executable instructions for:
   storing control-traffic-information associated with a device in a remote autonomous region of a fabric, the device having a real domain ID associated with the autonomous region;
   assigning a virtual domain ID to the device; and
   providing the virtual domain ID to another autonomous region of the fabric for sharing the device.

8. The system as recited in claim 7, wherein the computer executable instructions further comprise instructions for:
   selecting a data path for communication between the device and another device in the fabric.

9. The system as recited in claim 7, wherein the control-traffic information includes a worldwide name identification number and a domain ID number.

10. The system as recited in claim 7, wherein other devices in the other autonomous region use the virtual domain ID to send information to the device.

11. The system as recited in claim 7, wherein the system is a border switch.

12. The system as recited in claim 7, where the device is a storage device in a storage area network.

13. A method for configuring a fabric in a storage area network, comprising:
   storing control-traffic-information associated with a device in a remote autonomous region of a fabric, the device having a real domain ID associated with the autonomous region;
   assigning a virtual domain ID to the device; and
   providing the virtual domain ID to another autonomous region of the fabric for sharing the device.

14. The method as recited in claim 13, further comprising:
selecting a data path for communication between the device and another device in the fabric.

15. The method as recited in claim 13, wherein the control-traffic information includes a worldwide name identification number and a domain ID number.

16. The method as recited in claim 13, wherein other devices in the other autonomous region use the virtual domain ID to send information to the device.

17. The method as recited in claim 13, wherein the system is a border switch.

18. The method as recited in claim 13, where the device is a storage device in a storage area network.

\* \* \* \* \*